Jan. 3, 1956 F. A. HESTER 2,729,700

FACSIMILE SYSTEM WITH AUTOMATIC DENSITY CONTROL

Filed March 16, 1951

INVENTOR.
FRANK A. HESTER
BY
Carl V. Olson
ATTORNEY 2,729,700
Patented Jan. 3, 1956

2,729,700

FACSIMILE SYSTEM WITH AUTOMATIC DENSITY CONTROL

Frank A. Hester, New York, N. Y., assignor to Faximile, Inc., New York, N. Y., a corporation of Delaware Application March 16, 1951, Serial No. 215,959
5 Claims. (Cl. 178—6.6)

The present invention concerns facsimile systems, and more particularly, facsimile systems wherein a cyclic reference signal is sent to the recorder and used to prevent undesired variations in the received signal from affecting the density of recorded marks.

This application is a continuation-in-part of copending application Serial No. 52,717, filed on October 4, 1948, now abandoned.

In a facsimile system the original, or subject copy material, to be transmitted and reproduced at some distant point, is generally scanned by a small spot of light. This light is either reflected from the copy and picked up by a photoelectric cell placed above the copy or transmitted through the copy and picked up by a photoelectric cell placed on the other side of the copy. The density of the reflected or transmitted light will depend upon the density variations of the subject copy material. The photoelectric cell, because of its inherent qualities, transforms the variations in reflected or transmitted light density into electric signal variations. These electric signals, through properly designed circuits, are made proportional to and representative of the density of the copy being scanned. The electric signals are amplified and utilized for modulating a carrier for transmission to a distant point by either radio or wire links. At the distant point the signals are picked up by a suitable reception device, amplified, and used in a recording system, to reproduce the copy scanned at the transmitter.

Since it is common in facsimile techniques to transmit density variations in terms of amplitude variations in signal strength, the amplitude variations of the signals received at the recorder, regardless of the medium used for carrying signals from the transmitter to the recorder, must be comparable to the amplitude of the signals picked up by the photoelectric cell at the transmitter. For example, using an Eastman tone scale as a type of copy to be transmitted, if the ten shades of the scale from white to full black have signals which vary linearly with one another, the signal having the greatest amplitude being black, then the signals received at the recorder, representing the ten tone scale units, should also vary linearly with one another and the signal having the greatest amplitude should be capable of producing full black in the recording medium. If the signals received at the recorder do vary linearly with one another, and the signal having greatest amplitude is black; then, by proper adjustment, these signals can be made to reproduce the original subject matter with good fidelity.

In facsimile systems, there is an inherent limitation in the recording medium used. If a recording medium of the type described in Patent #2,339,267, issued to Hogan et al. on January 18, 1944, is used, the upper recording current corresponding to a full black signal is of the order of approximately 250 milliamperes, when the recorder is operating at 105 scanning lines per inch of copy and at a speed of 360 lines per minute, each line being 9 inches long. Therefore, the incoming black signal after being amplified must produce an output signal of 250 milliamperes current. If, for full black, a signal current of less than 250 milliamperes is produced across the recording electrodes, then the full black characteristics of the paper are not attained and, as a result, the scale between what should be a full black density and full white is somewhat compressed. If the output of the amplifier produces a signal current that is greater than 250 milliamperes, then some tone scale position less than full black will produce a full black mark on the recording paper and all signals above that will produce marks of no greater density. Therefore, there will be a compression on the upper end of the tone scale and fidelity will be lost. Hence, it is desirable that some means be used at the recorder to adjust initially the incoming signal voltages so that all signals representative of a particular density characteristic will record that density. When using the type of paper described above the recording currents will vary from those that will produce a current limit of 250 mils, corresponding to full black, to a no-current condition corresponding to full white. It is the purpose of the present invention to present a system that will control the amplification of all incoming signal voltages so that the above requirements will be met.

The use of automatic volume control in the present-day radio receiver is commonly understood and accepted. The purpose of the automatic density control described herein is similar to the purpose of automatic volume control, but, because the eye is much more critical than the ear, the type of automatic density control described herein must be much more critical than the automatic volume control system used in sound radio receivers. In a radio facsimile system, both the usual automatic volume control and the automatic density control of this invention may be employed simultaneously. Automatic volume control allows the operator to obtain a certain volume level that pleases him and then thereafter, within limitations, no matter what signals are received or what stations are selected, the volume produced at the speaker of the radio receiver will be essentially that of the initially selected volume. In this way the listener is not bothered by large variations in volume caused by fading or enhancing of the signals or caused by power output differences between stations of different frequencies. In the automatic type of density control, described herein, the recording paper takes the place of the listener and is a much more critical indicator. The recorder amplifier must be preset to produce output signals between an allowed maximum and an allowed minimum. Thereafter, regardless of any variation in signal level between the transmitter and receiver, variations in signal level received from different stations, or any other variations that may be introduced by any means whatsoever, the signal voltages produced across the recording medium must always be of the same order and should vary from the allowed minimum to the allowed maximum. If the allowed maximum is not attained, lack of fidelity will occur caused by inability of the signals to produce full black in the recording medium. If the allowed maximum signal is exceeded, lack of fidelity will occur in recording, caused by the compression of the upper end of the recording scale, producing black marks where something less than a full black mark should occur, and the recording paper may even be charred. The automatic volume control system used in the radio receiver may permit some variation from one station to another or from time to time, over a slight range, without too much dissatisfaction on the part of the listener. The automatic density control herein described prevents variations in output recording current due to variations in received signal strength, and due to variations in the extent of modulation of received signals. The variations in received signals may be variations in the signals from one transmitter or variations between signals from different transmitters. It will be understood that the automatic density control of this invention is not limited to radio facsimile systems but is also useful in systems wherein a wire line forms the communication link.

Though automatic volume control and automatic density control as described herein do have much in common, there are many and important differences between the two types of operation. The automatic volume control is controlled by the average signal strength of the incoming carrier, averaging out the modulation. The automatic density control described herein is controlled by the peak value of a special control pulse occurring between signals representative of successive lines of graphic copy scanned. Automatic volume control systems normally adjust the gain of the system continuously whereas the present automatic density control adjusts the gain only during a selected control interval. In the automatic density control of this invention, the recording apparatus forms an integral part of the system wherein recorded density is controlled by the level of a reference pulse.

To effect automatic density control, a pulse, transmitted by the transmitter at frequent intervals, is used, at the recorder, as a conrol or reference signal. The output level of this pulse is equal to that of a full black signal, or is in a predetermined relationship therewith. When picked up by the receiver, this pulse is used to control amplification of the video portion of the signal so that the recording will conform in graphic density to the copy scanned at the transmitter, regardless of the actual strength of the received signal. The control pulse may be the same pulse employed as a synchronizing pulse transmitted from the transmitter to the receiver to synchronize the two systems. Thus, the pulse serves a dual purpose in that its recurrence in time controls the operation of the recorder in synchronism with the transmitter, and the amplitude of the pulse conditions the operation of the recorder for the proper recording of the facsimile signals.

The facsimile recorder may be of the type employing linear and rotating helical recording electrodes cooperating on opposite sides of a conductive recording sheet to define the marking point thereon. The helical electrode may extend only 315 degrees around a supporting drum so that the recording circuit is open during 45 degrees of rotation of the helical electrode. According to the present invention, the received facsimile signal, after appropriate transformations, is applied to the recording electrodes and to a control circuit in parallel with the recording electrodes. The impedance of the conductive recording sheet between the recording electrodes is low compared with the impedance of the control circuit in parallel therewith. Therefore, during the 315 degrees of rotation when the helical electrode is in contact with the conductive recording sheet, the current division between the two parallel circuits is such that the control circuit is substantially unaffected by the video signal then present. During the 45 degrees of rotation when the recording electrodes do not make contact through the recording sheet, the control pulse is present and is applied solely to the control circuit.

The general object of the present invention is to provide automatic density control in facsimile systems.

Another object is to provide a system wherein all signals representative of graphic copy, when received at the recorder, will be so amplified and adjusted as to conform with a preset maximum and minimum signal voltage pattern.

A further object is to use a synchronized voltage signal for a dual purpose; to synchronize the transmitter and recorder systems, and to effect automatic density control.

A further object is to provide a system wherein, regardless of variations in values of signal strength produced between the transmitter and recorder, all signals representative of full black at the transmitter will be amplified to be signals resulting in the printing of full black at the recorder.

A further object is to provide automatic density control in facsimile systems and the like utilizing a constant amplitude synchronizing impulse as the control signal.

A further object is to provide an automatic density control wherein the recording electrodes and recording medium cooperate in separating the density control pulse from the video signal.

These and other objects of the present invention will be apparent to those skilled in the art from the detailed description of the invention given in connection with the various figures of the drawings.

The following description of the invention assumes negative transmission, that is, transmission in which black is represented by maximum signal amplitude and maximum recording current. It will be apparent to those skilled in the art that polarity changes at certain points in the system will make it operate equally well on a positive transmission type of signal where maximum signal intensity corresponds to white in the recorded copy.

Figure 1:
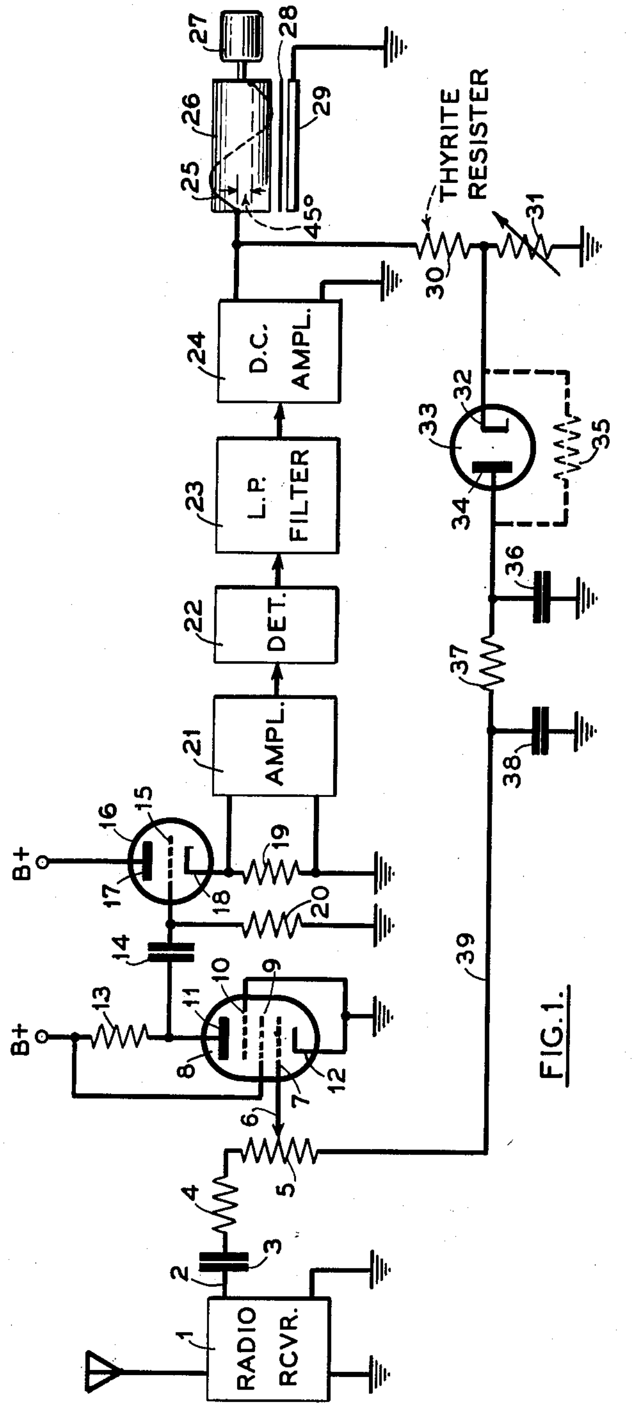
Fig. 1 shows a circuit of one form of the present invention.
Figure 2:
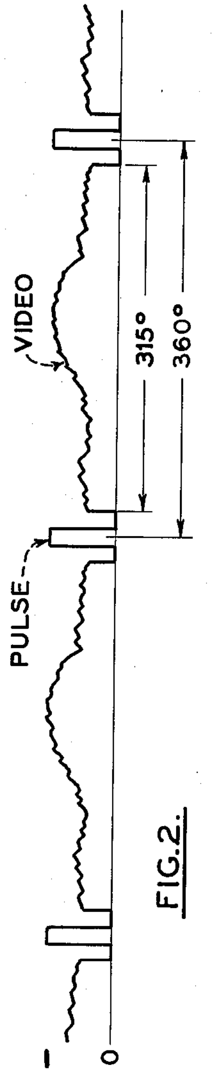
Fig. 2 is a representation of a facsimile signal, including reference pulses which may be employed for synchronizing and automatic density control purposes.

In Fig. 1, radio receiver 1 is any typical radio receiver for receiving, amplifying and detecting facsimile modulated radio frequency signals. In the form of the invention shown and described herein, the output of receiver 1 is in the form of a subcarrier (e. g., 10 kc.) which is amplitude modulated with the facsimile signal (e. g., 0–3 kc.). The modulated subcarrier, which may have an envelope as shown in Fig. 2, is fed over lead 2, through coupling condenser 3, and dropping resistor 4, to potentiometer 5. A portion of the signal appearing across potentiometer 5 is applied through lead 6 to grid 7 of thermionic vacuum tube 8. Thermionic vacuum tube 8 is any suitable tube, the gain of which may be controlled by means of a bias and may include, for instance, cathode 12, heated by means not shown, control grid 7, screen grid 9, suppressor grid 10, and plate 11. Plate 11 is connected through a load resistor 13 to a suitable source of plate voltage. Amplified signals appearing at plate 11 are coupled through capacitor 14 to grid 15 of an additional thermionic tube 16, which may have a cathode 18 heated by means not shown, a control grid 15 to a plate 17. A grid resistor 20 is used to maintain the D.-C. grid voltage of grid 15 at ground potential. Output signals from tube 16 may be taken at any convenient output point as, for instance, across cathode resistor 19 and applied to the input of amplifier 21.

The output of amplifier 21 is applied to detector 22. The output of the detector includes the facsimile or video signal, which has component frequencies of 0–3 kc. in the present example. Low-pass filter 23 passes the facsimile signal and blocks the subcarrier. Direct-current amplifier 24, which is of the constant-current type, amplifies the facsimile signal from filter 24. The output of amplifier 24 is applied to two parallel circuits. The first circuit includes the 315-degree helical recording electrode 25 (mounted on drum 26 driven by motor 27), the conductive recording sheet 28, and the linear recording electrode 29. The second of the parallel circuits includes non-linear resistor ("Thyrite") 30 and variable resistor 31. The D.-C. amplifier 24, recording electrodes and non-linear resistor 30 may be as shown and described in Patent No. 2,457,131, issued on December 28, 1948, to R. C. Curtis.

The voltage appearing across resistor 31 is applied to cathode 32 of diode 33. Diode 33 has an anode 34 and a back leakage path represented by dotted resistor 35. Anode 34 is connected through a filter including capacitor 36, resistor 37 and capacitor 38 to grid resistor 5 of tube 8.

The facsimile signal from the D.-C. amplifier 24 may be as represented in Fig. 2, it being understood that the signal is negative with respect to ground. The signal includes video portions each representative of one line of graphic copy scanned. The signal also includes a reference pulse between the video signals representative of successive lines scanned. The pulses recur once per revolution of helical electrode 25. The motor 27 drives helical electrode 25 in synchronism with the received signal so that the 315 degrees during which the recording electrodes are operative coincides with the reception of the video signal. Synchronizing means are not shown here since they are well known in the art as shown in my prior Patent 2,512,647, issued June 27, 1950, and are not a part of this invention.

In operation, during the periods when a video signal is present, the shunting effect of the low impedance path through the recording medium 28 prevents the appearance of any substantial voltage across the parallel path including resistor 31. On the other hand, when the reference pulse is present, the output of D.-C. amplifier 24 is applied solely across the circuit including resistor 31 and a substantial control voltage, negative with respect to ground, is developed across resistor 31. This voltage is applied to the peaking circuit including diode 33 and filter 36, 37, 38. Each negative reference pulse charges capacitor 36 to the peak value and the voltage at 39 is a substantially steady value determined by the level of the received pulses. Capacitor 36 has a discharge path through leakage path 35. The circuit elements are selected in a manner well known in the art to provide a time constant such that the voltage at 39 remains substantially constant between pulses but follows changes in pulse level such as may occur due to fading of the received radio signal. The voltage at 39 also will, of course, depend on whether the received signal is from a close or distant, powerful or weak transmitting station, and on the extent of modulation of the transmitted signal.

The voltage at 39 is applied through grid resistor 5 to grid 7 of tube 8 to control the gain thereof. The gain of tube 8 varies as an inverse function of the voltage at 39. As a result, the recording current passed through conductive recording sheet 28 is always such as to record a mark of density corresponding with the graphic density scanned at the transmitter regardless of variations in the signal received.

While only one form of the invention has been shown and described, it will be understood that this has been done by way of illustration and not limitation.

What is claimed is:

1. A facsimile apparatus for recording graphic copy having tonal density values varying between black and white, comprising a variable gain amplifier having input terminals for receiving signals representative of said copy, a constant current amplifier electrically connected to said voltage amplifier, a pair of circuits connected in parallel to the constant current amplifier, one of said circuits including a pair of contacting conductive recording electrodes, said electrodes being periodically out of contact with each other to interrupt said one circuit at predetermined intervals, and the other of said circuits including in series connection a non-linear resistor and a linear resistor; and a control circuit including a rectifier and a filter connected to said resistors, said control circuit being connected to an input terminal of the amplifier to apply a gain control voltage thereto when said one circuit is interrupted.

2. A facsimile apparatus according to claim 1, wherein one of said electrodes is a rotatable helical member, the angular extent of said member being less than 360 degrees.

3. A facsimile apparatus according to claim 2, wherein the other of said electrodes is a straight linear member disposed to contact the rotatable electrode during a predetermined portion of each rotation thereof.

4. A facsimile apparatus for recording graphic copy having tonal density values varying between black and white on a recording medium, comprising a variable gain amplifier having an input receptive to signals and to periodically recurring reference pulses, said pulses corresponding in amplitude to a predetermined light density, said signals being representative of said tonal density values and occurring for predetermined time intervals, a direct current amplifier in circuit with said voltage amplifier and having a substantially constant current output, a pair of parallel circuits connected to said direct current amplifier, one of said circuits including a pair of electrodes and said recording medium and being a closed circuit for the times said signals occur and being an open circuit for the times said reference pulses occur, the other of said parallel circuits including series connected non-linear and linear resistors, and a control circuit connected between the input of the voltage amplifier and said other circuit to apply a control voltage to the voltage amplifier and control the gain thereof, said control circuit comprising a rectifier and a filter having a predetermined time constant such that said control voltage remains substantially constant during the times said signals occur and follows changes in amplitude of said pulses during reception thereof, whereby the recorded graphic copy is automatically controlled in tonal density.

5. A facsimile apparatus according to claim 4, wherein said filter includes a capacitor connected in parallel with said linear resistor with said rectifier disposed therebetween, said control voltage being derived across said linear resistor for charging said capacitor through the rectifier, there being a capacitor discharge path through the rectifier.

References Cited in the file of this patent

UNITED STATES PATENTS

| | | |
|---|---|---|
| 2,208,927 | Hefele | July 23, 1940 |
| 2,251,929 | Freeman et al. | Aug. 12, 1941 |
| 2,258,871 | Wedig | Oct. 14, 1941 |
| 2,288,434 | Bradley | June 30, 1942 |
| 2,300,942 | Lewis | Nov. 3, 1942 |
| 2,457,131 | Curtis | Dec. 28, 1948 |
| 2,506,668 | Haynes | May 9, 1950 |
| 2,550,960 | Brabham | May 1, 1951 |
| 2,615,089 | Rogers | Oct. 21, 1952 |

FOREIGN PATENTS

| | | |
|---|---|---|
| 26,215 | Australia | Apr. 15, 1930 |
| 422,914 | Great Britain | Jan. 11, 1935 |
| 560,122 | Great Britain | Mar. 21, 1944 |